United States Patent
Burcham et al.

(10) Patent No.: US 7,900,249 B2
(45) Date of Patent: *Mar. 1, 2011

(54) METHOD, SYSTEM AND SOFTWARE FOR MAINTAINING NETWORK ACCESS AND SECURITY

(75) Inventors: Bill Burcham, Plano, TX (US); Sanjay Cherian, Flower Mound, TX (US); Darron Shaffer, Plano, TX (US)

(73) Assignee: Sterling Commerce, Inc., Dublin, OH (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/256,999

(22) Filed: Oct. 23, 2008

(65) Prior Publication Data

US 2009/0044262 A1 Feb. 12, 2009

Related U.S. Application Data

(63) Continuation of application No. 10/829,702, filed on Apr. 22, 2004, now Pat. No. 7,444,505.

(51) Int. Cl.
*G06F 9/00* (2006.01)
*H06F 9/00* (2006.01)
*H06F 9/32* (2006.01)

(52) U.S. Cl. .................. 726/12; 713/151; 713/152; 713/153; 713/161; 713/162; 726/2; 726/3; 726/4; 726/5; 726/6

(58) Field of Classification Search .................. 726/12
See application file for complete search history.

(56) References Cited

U.S. PATENT DOCUMENTS

| | | | |
|---|---|---|---|
| 7,444,505 B2 * | 10/2008 | Burcham et al. ............ | 713/153 |
| 2003/0177387 A1 * | 9/2003 | Osterwalder et al. ........ | 713/201 |

* cited by examiner

*Primary Examiner* — Longbit Chai
(74) *Attorney, Agent, or Firm* — Jackson Walker L.L.P.

(57) ABSTRACT

A system, method and apparatus for securing communications between a trusted network and an untrusted network are disclosed. A perimeter client is deployed within the trusted network and communicates over a session multiplexing enabled protocol with a perimeter server deployed within a demilitarized zone network. The perimeter client presents requests to make available and communication initiation requests to the perimeter server which presents corresponding sockets to the entrusted network. The session multiplexing capabilities of the protocol used between the perimeter server and perimeter client permit a single communication session therebetween to support a plurality of communication sessions between the perimeter server and untrusted network. In the event data flows across the communication sessions are encrypted, decryption of the data flows is left to the components at the end points of the communication session, thereby restricting exposure of privileged information to areas within trusted networks.

17 Claims, 3 Drawing Sheets

METHOD, SYSTEM AND SOFTWARE FOR MAINTAINING NETWORK ACCESS AND SECURITY

TECHNICAL FIELD OF THE INVENTION

The present invention relates generally to information sharing and, more particularly, to providing improved network security.

BACKGROUND OF THE INVENTION

In general, network security concerns private network perimeter protection. To such an end, firewalls and intrusion detection tools are often employed. Firewalls may be generally defined as exclusionary mechanisms, screening requests as they arrive and refusing access to users and protocols failing to establish access rights to trusted networks. In such environment, new users and applications often require new rules thereby increasing implementation complexity as network-enabled applications proliferate.

To limit or eliminate direct communications between trusted and untrusted networks, organizations may employ demilitarized zone (DMZ) networks. A DMZ network may be characterized as one or more intermediary areas where application or user access to trusted networks is screened or authorized. In complex applications, such as encryption and authentication/authorization mechanisms, processing perimeter requests typically creates complexity and bottlenecks. As a result, performance degradation, user inconvenience and administration overhead plague secure applications needing to cross the perimeter. These and other problems are often exacerbated when multiple participants seek to cross the perimeter, each with their own security guidelines and architecture.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments and their advantages are best understood by reference to FIGS. 1 through 4, wherein like numbers are used to indicate like and corresponding parts.

Figure 1:
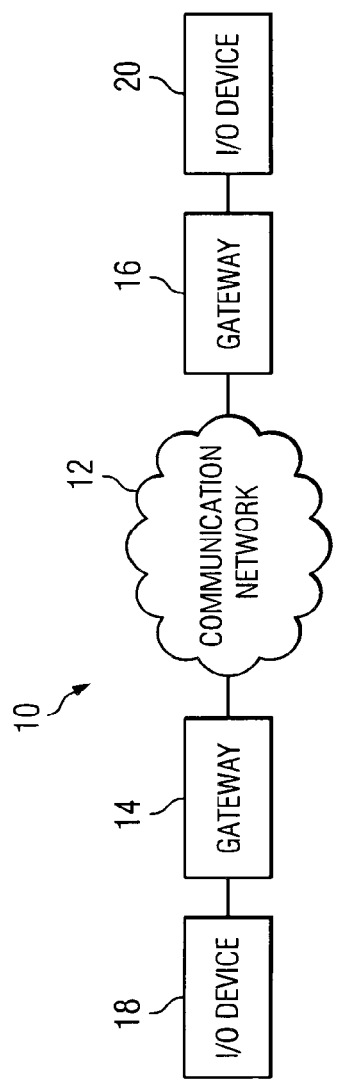
FIG. 1 is a schematic diagram depicting one embodiment of a communications system incorporating teachings of the present invention.

Referring first to FIG. 1, a schematic diagram of an exemplary embodiment of a communications system, indicated generally at 10 is shown. Communication system 10 may include communication network 12 in communication with one or more gateway devices 14 and 16. Input/output (I/O) devices 18 and 20 are each preferably in communication with respective gateway devices 14 and 16. Accordingly, I/O devices 18 and 20 may be in selective communication with each other via gateway devices 14 and 16, and communication network 12.

In one embodiment, communication network 12 may be a public switched telephone network (PSTN). In alternate embodiments, communication network 12 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks.

Gateways 14 and 16 preferably provide I/O devices 18 and 20 with an entrance to communication network 12 and may include software and hardware components to manage traffic entering and exiting communication network 12 and conversion between the communication protocols used by I/O devices 18 and 20 and communication network 12. In some embodiments, gateways 14 and 16 may function as a proxy server and a firewall server for I/O devices 18 and 20. In some embodiments, gateways 14 and 16 may be associated with a router (not expressly shown), operable to direct a given packet of data that arrives at gateway 14 or 16, and a switch (not expressly shown), operable to provide a communication path in to and out of gateway 14 or 16.

In an exemplary embodiment, I/O devices 18 and 20 may include a variety of forms of communication equipment connected to communication network 12 and accessible to a user. I/O devices 18 and 20 may be telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or other types or combinations of communication equipment available to a user. I/O devices 18 and 20 may be equipped for connectivity to communication network 12 via a PSTN, DSL, cable network, wireless network, or other communications channel.

Figure 2:
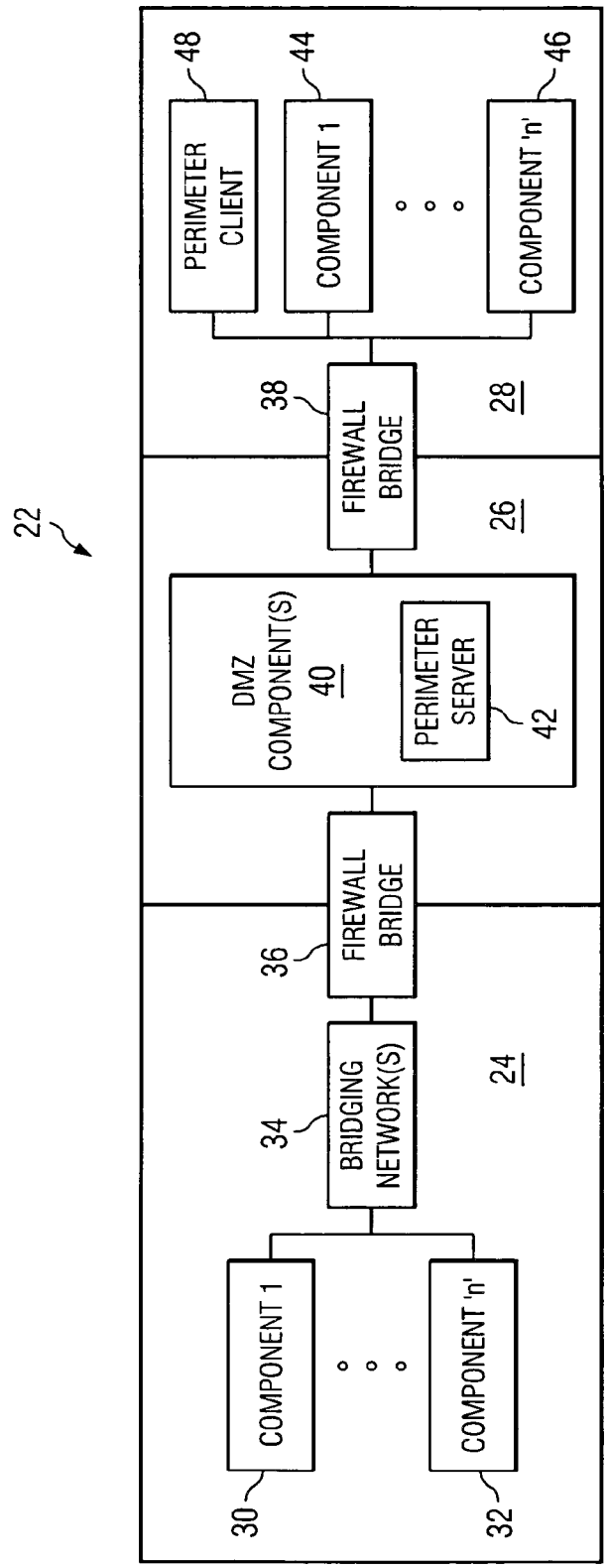
FIG. 2 is a schematic diagram depicting an alternate embodiment of a communications system incorporating teachings of the present invention.

Referring now to FIG. 2, an alternate embodiment of an exemplary communications system incorporating teachings of the present invention is shown. In the exemplary embodiment shown, communications system 22 includes untrusted network 24 in communication with demilitarized network (DMZ) 26. DMZ network 26 is also shown in communication with secure or trusted network 28. Accordingly, untrusted network 24 and trusted network 26 may be in selective communication with one another through DMZ network 26.

According to teachings of the present invention, trusted network 28 may differ from untrusted network in myriad respects. In an exemplary embodiment, input/output (I/O) devices included in trusted network 28 preferably have access and rights to modify privileged information. Such capability is unavailable to I/O devices in networks having a lower level of trust, such as untrusted network 24. Variations in trusted and untrusted networks may be observed in accordance with the teachings of the present invention.

Depending upon implementation, untrusted network 24 may be configured in myriad formats. As illustrated in FIG. 2, the exemplary embodiment of untrusted network 24 includes a plurality of components 30 and 32. Components 30 and 32 may include client systems, server systems, combinations of client and server systems, as well as other network operable devices.

Components 30 and 32, as illustrated in exemplary untrusted network embodiment 24, may be coupled to DMZ network 26 through one or more bridging networks 34. For example, components 30 and 32 may be included in a private network that is coupled to external networks through one or more DMZ networks or other network arrangements. Other implementations and configurations of an untrusted network are contemplated within the spirit and scope of the present invention.

Like untrusted network 24, DMZ network 26 may be implemented in a variety of configurations. In the exemplary embodiment illustrated in FIG. 2, DMZ network 26 is in communication with untrusted network 24 via front or first firewall bridge 36. Similarly, DMZ network 26 is in communication with trusted network through back or second firewall bridge 38.

As described above, a DMZ network may be generally characterized as an intermediary area operable to screen or authorize applications or users seeking access to trusted networks. As shown in the exemplary embodiment of DMZ network 26 illustrated in FIG. 2, a plurality of components 40 may be included therein. According to teachings of the present invention, among the components preferably included in DMZ network 26 is perimeter server 42. Preferred capabilities of perimeter server 42 are discussed in greater detail below.

As illustrated in to the exemplary embodiment of FIG. 2, trusted network 28 preferably includes a plurality of components 44 and 46 and perimeter client 48. Depending upon implementation, components 44, 46 and perimeter client 48 may be implemented as one or more clients, servers, other network compatible devices or some combination thereof. Also depending upon implementation, perimeter client 48 may be implemented within or hosted by one or more of trusted network components 44 and 46. Preferred capabilities of perimeter client 48 are discussed in greater detail below. In addition, other configurations are available to effectively implement teachings of the present invention. For example, trusted network 28 may include one or more bridging networks, DMZ networks, or other communicative devices or arrangements.

According to one implementation of teachings of the present invention, enhanced network security may be provided through the capabilities discussed herein and implemented in perimeter server 42 and perimeter client 48. In an exemplary embodiment, perimeter client 48 is preferably implemented as a software module included on one or more components 44 and 46 included in trusted network 28.

In an exemplary embodiment of the teachings of the present invention, perimeter client 48 is preferably operable and/or configured to provide one or more socket programming application programming interfaces (API) for utilization by components 44 and 46 of trusted network 28 and, potentially, by one or more aspects of DMZ network 26. In general, according to teachings of the present invention, TCP/IP-based communication protocol clients and/or servers in trusted network 28 preferably employ one or more services provided by perimeter client 48 to await inbound TCP/IP socket connections and initiate outbound TCP/IP socket connections as well as perform other operations. Perimeter server 42 is preferably operable and/or configured to enact socket requests received from trusted network components, via perimeter client 48, through such operations as binding to ports, accepting externally-initiated connections and initiating connections to external hosts.

In operation, socket operations and other communications are preferably relayed between perimeter client 48 and perimeter server 42 via an application-specific protocol P. Protocol P may assume a variety of forms. General guidelines for the capabilities recommended for a protocol P selection are discussed herein. At a minimum, protocol P preferably supports communication session multiplexing.

Figure 3:
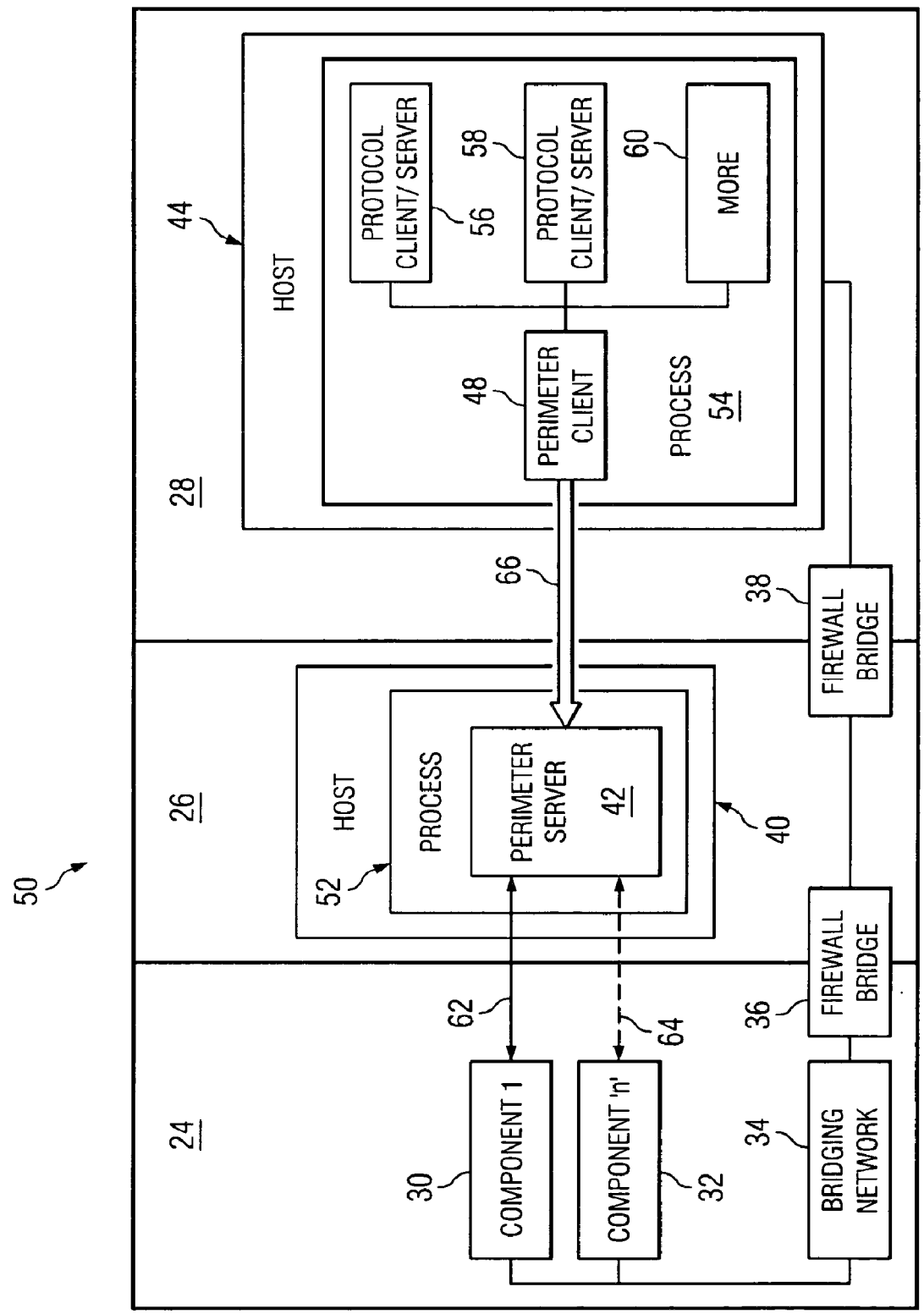
FIG. 3 is a schematic diagram depicting a further embodiment of a communications system incorporating teachings of the present invention.

Referring now to FIG. 3, a schematic diagram depicting another exemplary embodiment of a communication system incorporating teachings of the present invention is shown. Exemplary communication system 50 of FIG. 3, similar to communication system 22 of FIG. 2, includes untrusted network 24 in communication with DMZ network 26. In addition, communication system 50 also includes trusted network 28 in communication with DMZ network 26. Accordingly, untrusted network 24 and trusted network 26 may be in selective communication with one another through DMZ network 26.

Within DMZ network 26, as illustrated in FIG. 3, perimeter server 42 may be operating in association with one or more hosts or components 40. In an alternate embodiment, perimeter server 42 may be implemented within one or more processes 52 operating on host or component 40. Alternative configurations for the implementation of perimeter server 42 within DMZ network 26 are contemplated within the teachings of the present invention.

Within trusted network 28, as illustrated in exemplary communication system 50 of FIG. 3, perimeter client 48 may be operating in association with one or more trusted network components 44. In one aspect, perimeter client 48 may be implemented within one or more processes 54 operating on trusted network host or component 44. A plurality of additional trusted network components or applications, such as client or server components 56, 58 and 60, may also be hosted by one or more processes 54 operating on trusted network host or component 44. Alternative configurations for implementing or deploying perimeter client 48 within trusted network 28 are contemplated within the teachings of the present invention.

In one aspect, FIG. 3 depicts an exemplary configuration of the present invention with perimeter server 42 deployed in DMZ network 26 and an application utilizing perimeter client 48 deployed inside trusted network 28. In the illustrated exemplar, arrows 62, 64 and 66 depict communication connections between components. It should be noted that the depicted communication connections are actually flowing over physical network components, such as bridging network 34, front and back firewalls 36 and 38, respectively etc.

According to teachings of the present invention, one or more protocol clients and servers, such as trusted network components 56, 58 and 60, preferably utilize perimeter client 48 and its associated one or more socket APIs to initiate or otherwise facilitate communication connections with one or more untrusted network components. Requests for the initiation of a communication session from a trusted network component are sent to perimeter client 48 and preferably converted to protocol P by perimeter client 48 before being sent to perimeter server 42 for processing as described herein. In addition, the one or more trusted network protocol clients and servers may utilize perimeter client 48 and its associated socket APIs to present passive sockets to which one or more untrusted network components, such as components 30 and 32, may initiate or accept communication connections with one or more trusted network components. In an exemplary embodiment of a perimeter services solution incorporating teachings of the present invention, the one or more protocol clients and servers are preferably co-resident with perimeter client 48.

Upon initiation of process 54 and/or associated perimeter client 48, a plurality of TCP/IP sessions are preferably established. In a preferred embodiment, perimeter client 48, upon initiation and not requiring an initiation of external communication request from a trusted network component, establishes a predetermined number of TCP/IP (transmission control protocol/Internet protocol) sessions with perimeter server 42, as indicated at arrow 66. In addition, in an exemplary embodiment, the TCP/IP sessions initiated by perimeter client 48 are preferably substantially continuously maintained, i.e., they are substantially persistent. The directionality of arrow 66 suggests that TCP/IP sessions are established from perimeter client 48 to perimeter server 42, not in the other direction.

In one aspect, pre-establishing substantially persistent communication connections between perimeter client 48 and perimeter server 42 and carrying perimeter client requests, perimeter server responses, and subsequent session data over the same connections, reduces or eliminates situations where perimeter server 42, within less trusted DMZ network 26, exposes one or more items of privileged or secure data to initiate a connection to a component within trusted network 28. This limited or restricted exposure of sensitive data is in harmony with network security best practices, and also minimizes configuration requirements in firewall bridge 38.

According to teachings of the present invention, in addition to communication session initiation requests, untrusted network originating contact requests and responses flowing between perimeter client 48 and perimeter server 42, subsequent communication session data flows, in both directions, preferably take place over the same pre-established, substantially persistent TCP/IP communication sessions initiated by perimeter client 48. In one embodiment, this communication session data may include application level protocols implemented by one or more protocol clients and/or servers as well as one or more protocols implemented by software resident on one or more of the communicating untrusted network components. Example application level protocols include secure FTP (file transfer protocol), HTTP/S (hypertext transfer protocol over secure socket layer).

In FIG. 3, for example, trusted network component 56 might implement a HTTP/S server and trusted network component 58 might implement a secure FTP server. Through the one or more socket APIs available from perimeter client 48, substantially any TCP/IP-based protocol, client or server, may be implemented so as to benefit from the perimeter services configuration teachings of the present invention.

In operation, at the TCP/IP protocol layer, there are preferably a fixed number of sessions between perimeter client 48 and perimeter server 42. In accordance with teachings of the present invention, this number of sessions preferably does not grow one-to-one with the number of sessions between perimeter server 42 and the one or more untrusted network components communicating with one or more trusted network components. For these teachings of the present invention to be effected, it must be true that each communication session between perimeter server 42 and perimeter client 48 is capable of managing the communication connections for a plurality of communication sessions between perimeter server 42 and a plurality of untrusted network components. In other words, the communication connection ratio between perimeter client 48 to perimeter server 42 connections and perimeter server 42 to untrusted network connections is a one-to-many ratio.

Figure 4:
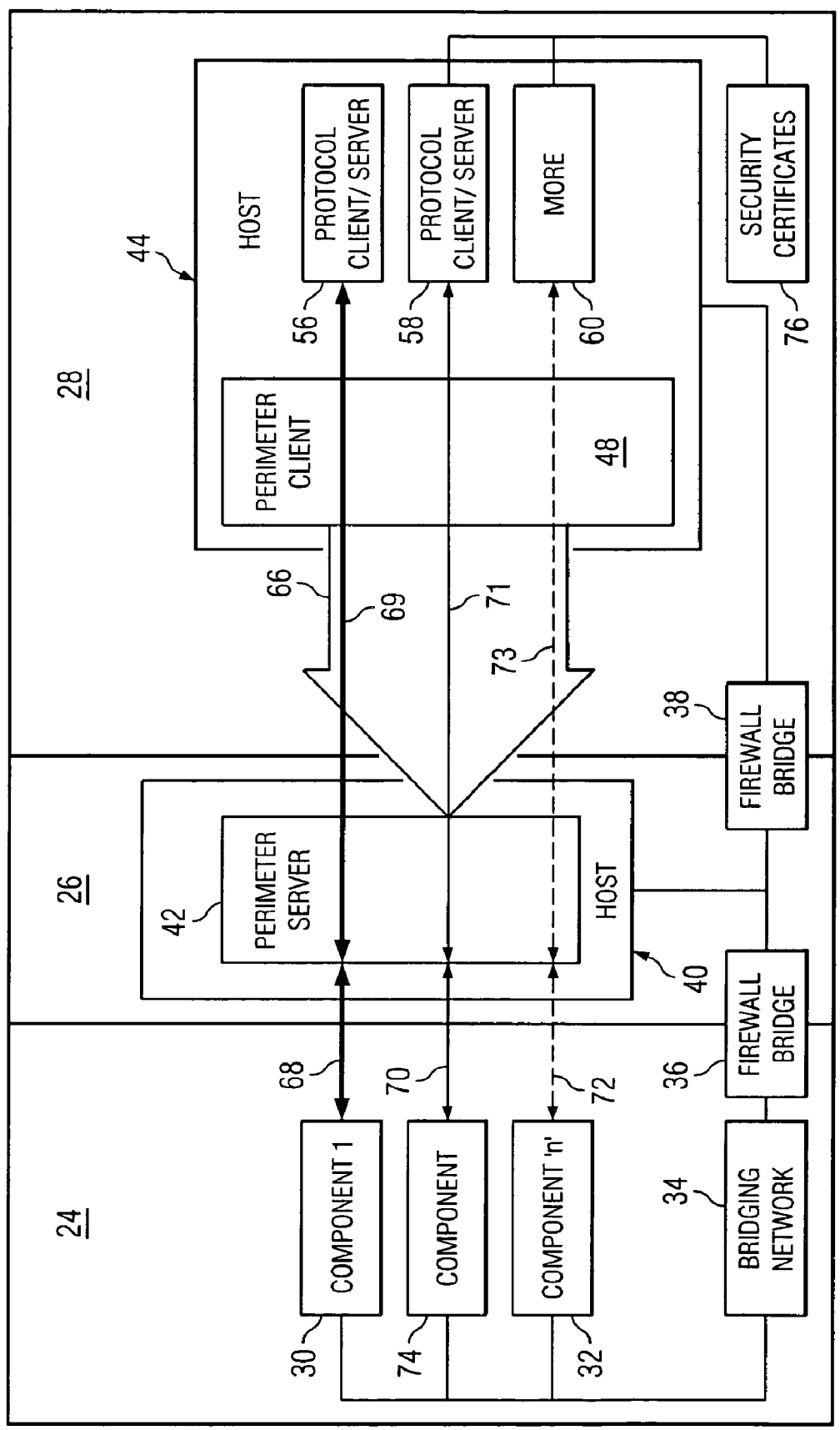
FIG. 4 is a schematic diagram depicting an alternate embodiment of a communications system incorporating teachings of the present invention.

Referring now to FIG. 4, an alternate embodiment of a telecommunication system incorporating teachings of the present invention is shown. As shown in FIG. 4, arrow 66 illustrates a single communication session between perimeter client 48 and perimeter server 42. According to teachings of the present invention, and as generally described above, single communication session 66 is preferably operable to carry, potentially, many "virtualized" TCP/IP communication sessions. It is, in part, by these means that end-to-end connectivity may be established between a plurality of untrusted network components and one or more trusted network components 56, 58 and 60, such as protocol client/servers. The ability of protocol P to carry more than one communication session per physical communication connection between perimeter server 42 and perimeter client 48 is often termed session multiplexing.

In network communications, generally, sockets are a precious resource. If protocol P were not able to multiplex communication sessions, perimeter server 42 would be required to maintain a socket connection for each TCP/IP communication session from perimeter server 42 to an untrusted network component and a socket connection for each communication connection between perimeter server 42 and perimeter client 48. As such, without the benefit of teachings of the present invention, each physical TCP/IP session consumes two sockets, one for the appropriate protocol client/server 56 or 58 and one for its associated untrusted network component 30, 32 or 74. Accordingly, without session multiplexing, two sockets would be consumed on perimeter server 42 for each communication session with untrusted network components 30, 32, etc. In addition, one socket would be consumed on perimeter client 48 for each communication session with the one or more untrusted network components 30, 32, etc. In all, that is three sockets for each communication session between an untrusted network component and a trusted network component. However, with session multiplexing, only one socket need be consumed on perimeter server 42 per untrusted network component communication session. As implemented in the present invention, many untrusted network component communication sessions share each multiplexed communication connection between perimeter server 42 and perimeter client 48, amortizing the cost of those sockets. Again, as mentioned above, enabling a one-to-many relationship between the number of sockets required between perimeter client 48 and perimeter server 42 and between perimeter server 42 and between perimeter server 42 and a plurality of untrusted network components.

Implementing a communications system in accordance with the perimeter services teachings of the present invention enables critical security functionality to be effected entirely inside trusted network 28 instead of inside less trusted DMZ network 26. In addition, transport-level security such as that provided by Secure Sockets Layer (SSL) and Transport Later Security (TLS) can be implemented above the APIs of perimeter client 48. Many positive performance and security ramifications flow from enabling such a configuration.

Continuing with FIG. 4, three end-to-end communication sessions are generally shown. A first end-to-end communication session between untrusted network component 30 and trusted network component 56 is depicted generally at arrows 68 and 69. A second end-to-end communication session between untrusted network component 74 and trusted network component 58 is depicted generally at arrows 70 and 71. A third end-to-end communication session between untrusted network component 32 and trusted network component 60 is depicted generally at arrows 72 and 73.

According to teachings of the present invention, a communication session between one or more untrusted network components and one or more trusted network components may employ a variety of communication protocols. For example, the communication session indicated by arrows 68 and 69 may be facilitated by one or more TCP/IP protocols between perimeter server 42 and untrusted network component 30 at arrow 68, via protocol P at arrow 69 between perimeter server 42 and perimeter client 48 and via a third protocol between perimeter client 48 and trusted network component 56. The communication sessions depicted generally by arrows 70 and 71 as well as by 72 and 73 may be similarly implemented. Other implementations are sequences of communication protocols may be used in accordance with the teachings of the present invention.

Communication session depicted by arrows 68 and 69 and 70 and 71 represent protected communication sessions between untrusted network components 30 and 74 and trusted network components 56 and 58, respectively. Represented as solid lines, communication sessions 68 and 69 and 70 and 71 are preferably subjected to at least transport layer cryptography. For example, communication sessions 68 and 69 and 70 and 71 may be implemented as encrypted sessions subjected to SSL or TLS security. Communication sessions 68 and 69 and 70 and 71 and/or their respective data flows may also be subjected to additional cryptographic operations.

In an exemplary embodiment of the present invention, perimeter server 42 serves as a conduit for communications authorized or permitted to occur between untrusted network 24 and perimeter client 48. In such a capacity, perimeter server 42 determines whether an untrusted network component communication should be passed to perimeter client 48 and, in some instances, wraps or packages the untrusted network component communication in protocol P before passing the untrusted network component communication to perimeter client 48 for processing in accordance therewith. As such, as described above, in a communications system implemented in accordance with teachings of the present invention, no cryptographic operations are performed on communication sessions by perimeter server 42 or perimeter client 48. Instead, cryptographic operations may be performed at the end-points of a communication session, e.g., at either the trusted network component or untrusted network component participating in a particular communication session. In this manner, computing resources may be conserved and the exposure of security certificates 76 is confined within trusted network 28 instead of less trusted DMZ network 26.

According to teachings of the present invention, security certificates 76 represent one of many possible types of sensitive information and services securely manipulable by a trusted network component, such as protocol client or server 56, 58 or 60. Other examples of sensitive information which may be further protected in accordance with teachings of the present invention include, without limitation, database management systems and enterprise resource planning (ERP) applications. With the perimeter services teachings of the present invention in place, secure, efficient, manageable bridges between trusted network services/components and untrusted network services/components may be established.

Communication session arrows 72 and 73, represented with dashed lines, indicates a communication session unencrypted at the transport layer. As there is no transport layer security implemented on flows communication session 72 and 73, no cryptographic operations are performed on that session's data by perimeter server 42 or perimeter client 48. Although communication session 72 and 73 is not subjected to transport layer security the data flows communicated thereon may be subject to one or more data level security measures. In such an implementation, a recipient trusted network component and/or untrusted network component is preferably operable to perform any cryptographic operations necessary to access the data.

The present invention substantially alleviates performance, congestion, and security and administration issues in situations where communications need to traverse the perimeter of trusted networks. Teachings of the present invention are substantially protocol independent and its implementation and configurations are comprehensible to persons familiar with the art. The present invention may be used as a component in proprietary products as well as in conjunction with other applications, including proxies and hardware firewalls.

Although the disclosed embodiments have been described in detail, it should be understood that various changes, substitutions and alterations can be made to the embodiments without departing from their spirit and scope.

What is claimed is:

1. A software for facilitating communications between a trusted network and a untrusted network, the software embodied in non-transitory computer readable storage media and when executed, by a processor, operable to direct a computer to:

establish at least one communication session between a trusted network and a demilitarized (DMZ) network, the at least one communication session operating on a protocol P operable to facilitate communication transactions between the DMZ network and the trusted network;

receive a request from a perimeter client operated within the trusted network to initiate a communication connection to an untrusted network component through the at least one communication session between the trusted network and the DMZ network;

convert the request for communication connection initiation to a protocol P format;

communicate the request to initiate a communication connection to a perimeter server operated within the DMZ network, the perimeter server operable to connect the trusted network component and the untrusted network component via the at least one communication session and to receive communication from the untrusted network component, wrap the untrusted network component communications in protocol P and communicate the untrusted network component communication via protocol P to the trusted network;

receive a request to make the perimeter client available for communication with the untrusted network;

convert the request to make the perimeter client available to protocol P;

communicate the request to make available to the perimeter server using protocol P and the established communication session, the perimeter server operable to present one or more passive sockets for communication to the untrusted network, await communication on the one or more passive sockets from one or more untrusted network components, upon receipt of a communication from an untrusted network component convert the untrusted network component communication to protocol P and communicate the untrusted network component communication to the trusted network using protocol P via the perimeter server and the perimeter client;

unwrap untrusted network component communications from protocol P; and direct the untrusted network component communication to its trusted network destination, the trusted network destination operable to perform necessary cryptographic operations on the untrusted network component communication.

2. A method for providing network security between a trusted network and an untrusted network, comprising:

configuring at least one processor to perform the steps of:

establishing at least one communication session between the trusted network and a demilitarized (DMZ) network, the at least one communication session operating on a protocol P operable to facilitate communication transactions between the DMZ network and the trusted network;

receiving a request from a perimeter client operated within the trusted network to initiate a communication connection to an untrusted network component through the at least one communication session between the trusted network and the DMZ network;

converting the request for communication connection initiation to a protocol P format;

communicating the request to initiate a communication connection to the perimeter server operated within the DMZ network, the perimeter server operable to connect the trusted network component and the untrusted network component via the at least one communication session and to receive communication from the untrusted network component, wrap the untrusted network component communications in protocol P and communicate the untrusted network component communication via protocol P to the trusted network;

receiving a request to make the perimeter client available for communication with the untrusted network;

converting the request to make the perimeter client available to protocol P;

communicating the request to make the trusted network component available to the perimeter server using protocol P and the established communication session, the perimeter server operable to present one or more passive sockets for communication to the untrusted network, await communication on the one or more passive sockets from one or more untrusted network components, upon receipt of a communication from an untrusted network component convert the untrusted network component communication to protocol P and communicate the untrusted network component communication to the trusted network using protocol P via the perimeter server and the perimeter client;

unwrapping untrusted network component communications from protocol P; and directing the untrusted network component communication to its trusted network destination, the trusted network destination operable to perform necessary cryptographic operations on the untrusted network component communication.

3. The method of claim 2, further comprising establishing the at least one communication session between the perimeter server and the trusted network via the perimeter client.

4. The method of claim 2, further comprising enabling a plurality of TCP/IP communication sessions within each communication session maintained between the perimeter server and the perimeter client within the trusted network.

5. The method of claim 2, further comprising:
receiving, in the perimeter server, communication connection requests from one or more untrusted network components;
wrapping the received communication connection requests in protocol P by the perimeter server; and
communicating the communication connection requests to the perimeter client via the one or more communication sessions using protocol P and over the communication session maintained between the perimeter server and the trusted network.

6. The method of claim 5, further comprising:
unwrapping the communication connection request from protocol P; and
forwarding the unwrapped communication connection requests to it trusted network destination.

7. The method of claim 6, further comprising effecting one or more security operations on the communication connection request by the trusted network component within the trusted network.

8. The method of claim 2, further comprising implementing transport level security over protocol P in the perimeter server and the perimeter client.

9. The method of claim 2, further comprising limiting initiation of communications between the trusted and untrusted networks to communication initiation requests received from communication participant components within the trusted or untrusted network.

10. A system for maintaining secure communications between a trusted network and an untrusted network, comprising:
memory;
at least one processor operably coupled to the memory;
at least one communications interface operably associated with the memory and the processor;
a perimeter client operable within the trusted network;
a perimeter server operable within a demilitarized zone network; wherein at least one communication session is established between the trusted network and a demilitarized (DMZ) network, the at least one communication session operating on a protocol P operable to facilitate communication transactions between the DMZ network and the trusted network;
a request from a perimeter client operated within the trusted network is received to initiate a communication connection to an untrusted network component through the at least one communication session between the trusted network and the DMZ network;
the request for communication connection initiation is converted to a protocol P format;
the request to initiate a communication connection is communicated to the perimeter server operated within the DMZ network, wherein the perimeter server is operable to connect the trusted network component and the untrusted network component via the at least one communication session and to receive communication from the untrusted network component, wrap the untrusted network component communications in protocol P and communicate the untrusted network component communication via protocol P to the trusted network;
a request to make the perimeter client available for communication with the untrusted network is received;
the request from the perimeter client to make the trusted network component available is converted to protocol P;
the request to make the trusted network component available is communicated to the perimeter server using protocol P and the established communication session, the perimeter server operable to present one or more passive sockets for communication to the untrusted network, await communication on the one or more passive sockets from one or more untrusted network components, upon receipt of a communication from an untrusted network component convert the untrusted network component communication to protocol P and communicate the untrusted network component communication to the trusted network using protocol P via the perimeter server and the perimeter client;

the untrusted network component communications is unwrapped from protocol P; and the untrusted network component communication is directed to its trusted network destination, the trusted network destination operable to perform necessary cryptographic operations on the untrusted network component communication.

11. The system of claim 10, further comprising the perimeter client operable to enable one or more transport level security measures on communications with the perimeter server.

12. The system of claim 10, further comprising the perimeter client operable to establish the one or more communication connections with the perimeter server.

13. The system of claim 10, further comprising the perimeter client operable to receive trusted network component requests to make available, wrap the requests in protocol P, and forward the wrapped requests to the perimeter server for processing.

14. The system of claim 10, further comprising the perimeter client operable to receive trusted network component outward bound untrusted network component connection requests, wrap the requests in protocol P, and forward the wrapped requests to the perimeter server for processing.

15. The system of claim 10, further comprising the perimeter client operable to unwrap the untrusted network component communication connection requests received from the perimeter server from protocol P and forward the unwrapped communication connection requests to a trusted network component destination.

16. The system of claim 10, further comprising the perimeter client operable to manage a plurality of TCP/IP communication sessions over each communication session between the perimeter client and the perimeter server.

17. The system of claim 10, further comprising the perimeter client operable to restrict communication initiation to trusted network and untrusted network component communication participant initiation requests.

* * * * *